(12) United States Patent
Mohri et al.

(10) Patent No.: US 6,303,091 B1
(45) Date of Patent: Oct. 16, 2001

(54) METAL OXIDE POWDER AND METHOD FOR THE PRODUCTION OF THE SAME

(75) Inventors: Masahide Mohri; Hironobu Koike; Shinichiro Tanaka; Tetsu Umeda; Hisashi Watanabe, all of Ibaraki; Kunio Saegusa, Tsukuba-gun; Akira Hasegawa, Ibaraki, all of (JP)

(73) Assignee: Sumitomo Chemical Company, Limited, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 08/416,738

(22) PCT Filed: Aug. 11, 1994

(86) PCT No.: PCT/JP94/01329

§ 371 Date: Jun. 9, 1995

§ 102(e) Date: Jun. 9, 1995

(87) PCT Pub. No.: WO95/04700

PCT Pub. Date: Feb. 16, 1995

(30) Foreign Application Priority Data

| Aug. 11, 1993 | (JP) | 5-220715 |
| Sep. 9, 1993 | (JP) | 5-249924 |
| Oct. 28, 1993 | (JP) | 5-294528 |
| Nov. 9, 1993 | (JP) | 5-304639 |

(51) Int. Cl.$^7$ .......................... C01F 17/00; C01G 25/00; C01G 19/00; C01G 15/00
(52) U.S. Cl. ........................ 423/263; 423/608; 423/618; 423/624
(58) Field of Search .................. 423/608, 610, 423/138, 148, 69, 74, 263, 21.1, 624, 618, 111, 89

(56) References Cited

U.S. PATENT DOCUMENTS

| 1,103,258 | * | 7/1914 | Brackelsberg . | |
| 2,852,362 | * | 9/1958 | Daubenspeck et al. | 423/74 |
| 3,896,211 | * | 7/1975 | Mayor et al. | 423/632 |
| 3,961,036 | * | 6/1976 | Hamner et al. | 423/630 |
| 3,980,753 | * | 9/1976 | Grill et al. | 423/636 |
| 4,465,656 | * | 8/1984 | Pastor et al. | 423/608 |
| 4,517,163 | * | 5/1985 | Jodden et al. | 423/75 |
| 4,668,501 | * | 5/1987 | Shibuta et al. | 423/608 |
| 5,039,452 | * | 8/1991 | Thompson et al. | 423/596 |
| 5,061,473 | * | 10/1991 | De Cleyn et al. | 423/610 |
| 5,688,480 | * | 11/1997 | Mohri et al. | 423/263 |

FOREIGN PATENT DOCUMENTS

| 56-37697 | * | 9/1981 | (JP) . | |
| 57-123824 | * | 8/1982 | (JP) . | |
| 58-91037 | * | 5/1983 | (JP) . | |
| 58-99119 | * | 6/1983 | (JP) | 423/606 |
| 62-017021 | * | 1/1987 | (JP) . | |
| 1-501062 | * | 4/1989 | (JP) . | |
| 2-025841 | * | 6/1990 | (JP) . | |
| 2-197014 | * | 8/1990 | (JP) . | |
| 3-059194 | * | 3/1991 | (JP) . | |

* cited by examiner

Primary Examiner—Steven Bos
(74) Attorney, Agent, or Firm—Sughrue, Mion, Zinn, Macpeak & Seas, PLLC

(57) ABSTRACT

A metal oxide powder except α-alumina, is disclosed comprising polyhedral particles having at least 6 planes each, a number average particle size of from 0.1 to 300 μm, and a $D_{90}/D_{10}$ ratio of 10 or less where $D_{10}$ and $D_{90}$ are particle sizes at 10% and 90% accumulation, respectively from the smallest particle size side in a cumulative particle size curve of the particles. This metal oxide powder contains less agglomerated particles, and has a narrow particle size distribution and a uniform particle shape.

11 Claims, 6 Drawing Sheets

METAL OXIDE POWDER AND METHOD FOR THE PRODUCTION OF THE SAME

FIELD OF THE INVENTION

The present invention relates to a metal oxide powder which is used as a raw material powder of an oxide ceramic that is used as a functional material or a structural material, a metal oxide powder which is used in a dispersed state as a filler or a pigment, or a metal oxide powder which is used as a raw material powder for the production of a single crystal or for flame spray coating, and a method for the production thereof.

PRIOR ART

In general, an oxide ceramic which is used as a functional material or a structural material is produced through a molding step and a calcination step from a metal oxide powder as a raw material. Properties of the metal oxide powder to be used as the raw material have a large influence on the production steps, and functions and physical properties of the ceramic product. Then, it is highly desired to provide a metal oxide powder having powder properties which are precisely controlled so that they are suitable for an intended application.

When a metal oxide powder is used in a dispersed state such as a magnetic fine powder, a filler or a pigment, since properties of each particle are reflected directly on the dispersed state, the control of the properties of the powder is more important.

The required properties of the metal oxide powder vary with a kind and application form of the metal oxide. Commonly required properties are a uniform particle size of the metal oxide powder, that is, a narrow particle size distribution, and a weak bond among primary particles, that is, less agglomeration and good dispersibility.

For example, a titanium oxide powder is widely used as a raw material of a white pigment, a raw material of a filler to be added to a resin, a raw material of a material having a high refractive index, a raw material of a UV light absorber, a raw material of a single crystal, a raw material of a photocatalytic active semiconductor, a raw material of a catalyst support, a raw material of an abrasive, a raw material of a dielectric material, and so on.

A zirconium oxide powder is useful as a material to be used in a high temperature material or a mechanical structural material, an ion conductive material, a piezoelectric material and so on, and is used as a raw material of a calcined body and a raw material for melt spray coating.

A magnesium oxide powder is a useful as a raw material of a refractory ceramic, a raw material of a functional ceramic such as an electronics material or an optical material, and the like.

A cerium oxide powder is one of oxides of rare earth elements, and useful as an electrical conductive material, an optical material, or an abrasive.

A tin oxide powder is a valuable material used as an electronics material, a pigment, a catalyst or an abrasive.

Hitherto, these metal oxides are produced by a liquid phase method, a gas phase method, a hydrothermal synthesis method, a direct oxidation method, an electrical fusion method, and the like. The produced metal oxide powders have some problems such as formation of agglomerates, nonuniformity in the particles, a wide particle size distribution, and so on, and they are not necessarily satisfactory. Further, the above production methods themselves have problems such as complicated procedures, problems of apparatuses, costs of raw materials, and so on. Then, it has been desired to develop a metal oxide powder which contains less agglomerated particles and have a narrow particle size distribution, and to develop a method for producing such metal oxide powder generally and advantageously in an industrial production.

SUMMARY OF THE INVENTION

An object of the present invention is to provide a metal oxide containing less agglomerated particles and having a narrow particle size distribution and a uniform particle shape, which is preferably used as a metal oxide powder to be used as a raw material powder of an oxide ceramic that is used as a functional material or a structural material, a metal oxide powder to be used in a dispersed state as a filler or a pigment, or a metal oxide powder to be used as a raw material powder for the production of a single crystal or for flame spray coating.

Another object of the present invention is to provide a production method which can be generally employed in the production of such metal oxide powder and is excellent industrially.

As a result of the extensive study on the metal oxide powders, it has been found that, when a raw material is calcined in a specific atmosphere gas, the above described metal oxide containing less agglomerated particles and having a narrow particle size distribution and a uniform particle shape is obtained, and that such method can be employed generally in the production of various metal oxide powders and excellent industrially, and the present invention has been completed after further investigations.

That is, according to a first aspect of the present invention, there is provided a metal oxide powder except α-alumina, comprising polyhedral particles having at least 6 planes each, a number average particle size of from 0.1 to 300 $\mu$m, and a $D_{90}/D_{10}$ ratio of 10 or less where $D_{10}$ and $D_{90}$ are particle sizes at 10% and 90% accumulation, respectively from the smallest particle size side in a cumulative particle size curve of the particles.

According to a second aspect of the present invention, there is provided a rutile type titanium oxide powder comprising polyhedral particles each having at least 8 planes.

According to a third aspect of the present invention, there is provided a method for producing a metal oxide powder except α-alumina, having a narrow particle size distribution, comprising calcining a metal oxide powder or a metal oxide precursor powder in the presence or absence of a seed crystal in an atmosphere containing at least one gas selected from the group consisting of (1) a hydrogen halide, (2) a component prepared from a molecular halogen and steam and (3) a molecular halogen.

DETAILED DESCRIPTION OF THE INVENTION

Figure 2:
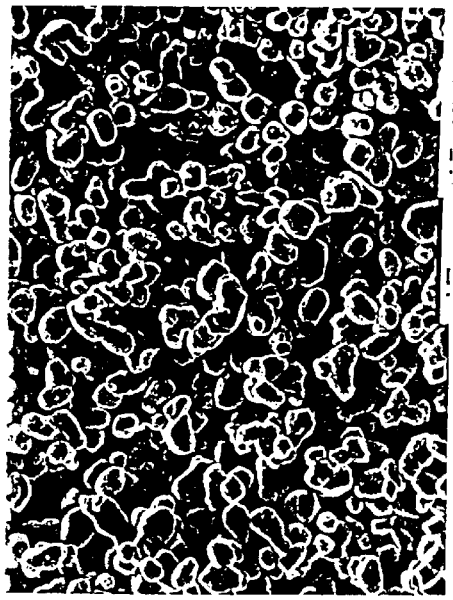
FIG. 2 is a scanning electron microscopic photograph (×1700) showing a particle structure of a titanium oxide powder observed in Example 7.

The present invention will be explained in detail.

The metal oxide powder having the narrow particle size distribution is a compound of a single metal element and oxygen consisting of polyhedral particles each having at least 6 planes (excluding complex oxides and α-alumina powder), which is distinguished from a metal oxide which is produced by the conventional methods and contains may agglomerated particles. Hereinafter, a compound of a single metal element and oxygen will be sometimes referred to as a "simple metal oxide".

The method of the present invention produces a metal oxide except α-alumina, having a narrow particle size distribution, by calcining a metal oxide powder or a metal oxide precursor powder in the presence or absence of a seed crystal in an atmosphere containing at least one gas selected from the group consisting of (1) a hydrogen halide, (2) a component prepared from a molecular halogen and steam and (3) a molecular halogen.

When the metal oxide powder having the narrow particle size distribution is produced by the method of the present invention, a metal oxide precursor powder is exemplified as a raw material.

Herein, the metal oxide precursor powder is intended to mean a material which gives the metal oxide consisting of the single metal and oxygen by a decomposition reaction or an oxidation reaction in calcination, and includes, for example, metal hydroxides, hydrated metal oxides, metal oxyhydroxide, metal oxyhalides, and so on.

When the metal oxide powder having the narrow particle size distribution is produced by the method of the present invention, a known metal oxide powder can be used as a raw material depending on the kind of the intended metal oxide powder.

As the raw material metal oxide powder, one having an average primary particle size of less than 0.1 $\mu$m is preferably used. As the average primary particle size of the raw material metal oxide powder, a particle size calculated from a BET specific surface area can be used. It is possible to produce the intended metal oxide powder having the narrow particle size distribution and the larger particle size than that of the raw material metal oxide powder, from the raw material metal oxide powder having the above particle size.

When the average primary particle size of the raw material powder is larger than 0.1 $\mu$m, the production of the metal oxide powder containing less agglomerated particles and having the narrow particle size distribution may become difficult.

A seed crystal which may be used in the present invention is intended to mean a crystal which functions as a growing site for the crystal growth of the intended metal oxide. Around the seed crystal, the metal oxide grows. Any seed crystal can be used insofar as it has this function. For example, when the metal oxide precursor is used as the raw material, the metal oxide powder is preferably used. Further, when the metal oxide powder having the average primary particle size of less than 0.1 $\mu$m is used as the raw material, a metal oxide powder having a larger particle size than the average particle size of the raw material metal oxide powder, for example, a particle size at least 5 times larger than the average primary particle size of the raw material is used.

When a crystal phase of the metal oxide as the raw material is changed to a more stable crystal phase by calcination, the metal oxide having the more stable crystal phase is preferred as the seed crystal.

There is no limitation on a manner for adding the seed crystal to the raw material powder. For example, a mixing manner such as ball milling, ultrasonic dispersing, and the like can be used.

The above described metal oxide precursor powder, the raw material metal powder, for instance, the metal oxide powder having the average primary particle size of 0.1 $\mu$m or less, and those raw materials to which the seed crystal is added are generally named as the raw material metal oxide powder.

Examples of the metal element contained in the raw material metal oxide powder are the metal elements of the Group lb of the Periodic Table such as copper, etc.; the metal elements of the Group II such as magnesium, zinc, etc.; the metal elements of the Group IIII such as yttrium, cerium, gallium, indium, uranium, etc.; the metal elements of the Group IV such as titanium, zirconium, germanium, etc.; the metal elements of the Group V such as vanadium, niobium, tantalum, bismuth, etc-; the metal elements of the Group VI such as chromium, the metal elements of the Group VII such as manganese; and the metal elements of the Group VIII such as iron, cobalt, nickel, etc. (except aluminum).

Preferred examples of the metal elements are magnesium, titanium, zirconium, iron, cerium, indium, and tin.

In the method of the production of the metal oxide powder according to the present invention, the raw material metal oxide is not limited, and the powder produced by the conventional method can be used. For example, the metal oxide powder or metal oxide precursor powder produced by the liquid phase method, or the metal oxide powder produced by the gas phase method or the solid phase method may be used.

In the present invention, the raw material metal oxide powder is calcined in the atmosphere gas containing at least 1 vol. %, preferably at least 5 vol. %, more preferably at least 10 vol. % of the hydrogen halide based on the whole volume of the atmosphere gas.

As the hydrogen halide, hydrogen chloride, hydrogen bromide, hydrogen iodide and hydrogen fluoride are used independently or as a mixture of two or more of them.

As a component of the atmosphere gas other than the hydrogen halide, that is, a diluent gas, nitrogen, inert gas such as argon, hydrogen, steam or an air can be used.

A pressure of the atmosphere gas containing the hydrogen halide is not limited, and selected from a pressure range which is industrially used.

It is possible to carry out the calcination in the atmosphere gas containing a component prepared from the molecular halogen and steam, in place of the hydrogen halide.

As the molecular halogen, molecular chlorine, bromine, iodine and fluorine are used independently or as a mixture of two or more of them.

The component gas is prepared from at least 1 vol. %, preferably at least 5 vol. %, more preferably at least 10 vol. % of the molecular halogen and at least 0.1 vol. %, preferably at least 1 vol. %, more preferably at least 5 vol. % of the steam, both based on the whole volume of the atmosphere gas.

In place of the hydrogen halide, the molecular halogen may be used. The raw material metal oxide powder is calcined in the atmosphere gas containing at least 1 vol. %, preferably at least 5 vol. %, more preferably at least 10 vol. % of the molecular halogen based on the whole volume of the atmosphere gas. As the molecular halogen, at least one of molecular chlorine, bromine and iodine can be used.

As a component of the atmosphere gas other than the component prepared from the molecular halogen and steam, or the molecular halogen, that is, a diluent gas, nitrogen, inert gas such as argon, hydrogen, steam or an air can be used.

A pressure in the reaction system is not limited, and freely selected from a pressure range which is industrially used.

A manner for supplying the atmosphere gas is not critical insofar as the atmosphere gas can be supplied to the reaction system in which the raw material metal oxide powder is present.

A source of each component of the atmosphere gas and a manner for supplying each component are not critical either.

For example, as the source of each component of the atmosphere gas, a gas in a bomb can be used. Alternatively, it is possible to prepare the atmosphere gas comprising the hydrogen halide or the molecular halogen using the evaporation or decomposition of a halogen compound such as an ammonium halide, or a halogen-containing polymer such as a vinyl chloride polymer. The atmosphere gas may be prepared by calcining a mixture of the raw material metal oxide and the halogen compound or halogen-containing polymer in a calcination furnace.

The hydrogen halide and the molecular halogen are preferably supplied from the bomb directly in the calcination furnace in view of the operability. The atmosphere gas may be supplied in a continuous manner or a batch manner.

According to the present invention, when the raw material metal oxide powder is calcined in the above atmosphere gas, the metal oxide grows at a site where the raw material metal oxide powder is present through the reaction between the raw material metal oxide powder and the atmosphere gas, so that the metal oxide powder having the narrow particle size distribution, but not agglomerated particles, is generated. Accordingly, the desired metal oxide powder can be obtained, for example, by simply filling the raw material metal oxide powder in a vessel and calcining it in the atmosphere gas.

As the raw material metal oxide powder to be used in the present invention, any material which is in a powder form may be used, and a bulk density of the powder is preferably at least 40% or less based on a theoretical density. When a molded material having the bulk density exceeding 40% based on the theoretical density is calcined, a sintering reaction proceeds in the calcination step, whereby grinding is necessitated to obtain the metal oxide powder, and the metal oxide powder having the narrow particle size distribution may not be obtained in some cases.

A suitable calcination temperature is not necessarily critical since it depends on the kind of the intended metal oxide, the kinds and concentrations of the hydrogen halide, the molecular halogen and the component prepared from the molecular halogen and steam, or the calcination time. It is preferably from 500 to 1500° C., more preferably from 600 to 1400° C. When the calcination temperature is lower than 500° C., a long time is necessary for calcination. When the calcination temperature exceeds 1500° C., many agglomerated particles tend to be contained in the produced metal oxide powder.

A suitable calcination time is not necessarily critical since it depends on the kind of the intended metal oxide, the kinds and concentrations of the hydrogen halide, the molecular halogen and the component prepared from the molecular halogen and steam, or the calcination temperature. It is preferably at least 1 minute, more preferably at least 10 minutes, and selected from a range in which the intended metal oxide powder is obtained. As the calcination temperature is higher, the calcination time is shorter.

When the raw material metal oxide powder containing the seed crystal is calcined, the calcination temperature can be lower and the calcination time can be shorter than those when no seed crystal is used, since the metal oxide grows around the seed crystals as the growing sites.

A type of a calcination apparatus is not limited, and a so-called calcination furnace may be used. The calcination furnace is preferably made of a material which is not corroded by the hydrogen halide or the halogen, and preferably comprises a mechanism for adjusting the atmosphere.

Since the acidic gas such as the hydrogen halide or the halogen is used, the calcination furnace is preferably an airtight one. In the industrial production, preferably the calcination is carried out continuously, and a tunnel furnace, a rotary kiln, or a pusher furnace can be used.

As a vessel used in the calcination step in which the raw material metal oxide powder is filled, preferably a crucible or a boat made of alumina, quartz, acid-resistant brick, graphite, or a noble metal such as platinum is used, since the reaction proceeds in the acidic atmosphere.

When the metal oxide powder is produced with the addition of the seed crystal to the raw material powder, the particle size and the particle size distribution of the metal oxide powder as the product can be controlled by changing a particle size and an added amount of the seed crystal. For example, when the amount of the seed crystal is increased, the particle size of the produced metal oxide powder is decreased. When the seed crystal having the smaller particle size is used, the particle size of the produced metal oxide powder is decreased.

By the above described method, as shown in the attached photographs, the metal oxide powder which is not agglomerated particles, and has the narrow particle size distribution and uniform particle size can be obtained, and the particle size can be controlled.

Though the metal oxide powder may be agglomerated particles or contain agglomerated particles, a degree of agglomeration is small, and therefore the metal oxide powder which contains no agglomerated particle is easily produced by simple grinding.

A number average particle size of the metal oxide powder obtained by the method of the present invention is not necessarily limited. In general, it is possible to obtain the metal oxide powder having the particle size of 0.1 to 300 µm.

The metal oxide powder obtained by the method of the present invention has, as the particle size distribution, a $D_{90}/D_{10}$ ratio of 10 or less, preferably 5 or less, where $D_{10}$ and $D_{90}$ are particle sizes at 10% and 90% accumulation, respectively from the smallest particle size side in a cumulative particle size curve of the particles.

When a particle size distribution is measured by a centrifugal sedimentation method or a laser diffraction scattering method, the obtained value is a particle size distribution of the agglomerated particles. When the particle size distribution measured by such method is narrow but the powder contains the agglomerated particles, the dispersibility is deteriorated, and such powder is not suitable as an industrial raw material. In the present invention, as a criterion of agglomeration of the powder, a primary particle size is measured, as a number average value, from a scanning electron microscopic photograph, and the obtained value is compared with an agglomerated particle size, that is, a particle size at 50% accumulation in a cumulative particle size curve of the particles ($D_{50}$).

That is, the degree of agglomeration is evaluated by a ratio of the agglomerated particle size to the primary particle size. When this ratio exceeds 1 (one), the powder is in the ideal state containing no agglomerated particle. With the actual powder, this ratio exceeds 1. When this ratio is 6 or less, the powder can be preferably used as the industrial raw material.

The metal oxide powder obtained by the method of the present invention has the ratio of the agglomerated particle size to the primary particle size of, preferably from 1 to 6, more preferably from 1 to 3, most preferably from 1 to 2.

Each of the particles of the metal oxide powder of the present invention has a polyhedral form having at least 6 planes. The number of the planes is usually from 6 to 60, preferably from 6 to 30.

Concrete examples of the metal oxide powder of the present invention will be explained.

The particle of the rutile type titanium oxide powder of the present invention comprises a polyhedron having at least 8 planes with a crystal plane being exposed. The particle of the rutile titanium oxide powder of the present invention preferably comprises a polyhedron having 8 to 60 planes, more preferably 8 to 30 planes. This is because the inside of the particle is uniform, and the powder has less grain boundaries and less lattice defects in the particle. In particular, the particle is preferably a single crystal particle. When the number of the planes of the polyhedron is less than 8, the growth of the crystal is incomplete. When the number of the polyhedron exceeds 60, the number of the lattice defects in the particle tends to increase. When a large step may be present on one crystal plane of the particle, such plane is regarded as one plane in the present invention.

The rutile type titanium oxide is characterized in that the particle size distribution is narrow, and the number of the agglomerated particles is small. The ratio of the agglomerated particle size to the primary particle size is preferably from 1 to 2. The $D_{90}/D_{10}$ ratio is 10 or less, preferably 5 or less.

When the BET specific surface area is large, the powder contains many agglomerated particles and is not suitable as the industrial raw material. Then, the BET specific surface area is preferably 10 m$^2$/g or less. When the BET specific surface area is less than 0.1 m$^2$/g, the primary particle size is too large and the particles cause sedimentation when they are dispersed in a solvent. Therefore, the BET specific surface area is preferably from 0.1 to 10 m$^2$/g, more preferably 0.1 to 5 m$^2$/g.

The zirconium oxide particles of the present invention are characterized in that their shape and particle size are uniform. The particle shape is a polyhedron having at least 8 planes. Their particle size and particle size distribution are controlled in the specific ranges. The particle size is usually controlled in the range from about 1 µm to several hundred alm. This control of the particle size can be done by the selection of the raw material and the calcination conditions in the method of the present invention.

As the raw material powder for the flame spray coating, one having the large particle size is preferred. As the powder preferred for this use, the zirconium oxide powder comprising the particles having, preferably at least 20 µm, more preferably about 40 µm is selected.

That is, the above described method can produce the zirconium oxide powder having the relatively large average particle size suitable as the raw material for the flame spray coating, by the industrially advantageous steps.

The zirconium oxide powder of the present invention has the $D_{90}/D_{10}$ ratio of 10 or less, preferably 5 or less. Further, the ratio of the agglomerated particle size to the primary particle size is preferably from 1 to 3, more preferably from 1 to 2.

The magnesium oxide particles of the present invention are characterized in that their shape and particle size are uniform. The particle shape is a polyhedron having at least 8 planes. Their particle size and particle size distribution are controlled in the specific ranges. The particle size is usually controlled in the range from about 1 µm to several hundred µm. This control of the particle size can be done by the selection of the raw material and the calcination conditions in the method of the present invention.

The manganese oxide powder of the present invention has the $D_{90}/D_{10}$ ratio 10 or less, preferably 5 or less. Further, the ratio of the agglomerated particle size to the primary particle size is preferably from 1 to 3, more preferably from 1 to 2.

The cerium oxide particles of the present invention are characterized in that their shape and particle size are uniform. As is clear from the attached photographs, they are the cerium oxide cubic particles having the uniform shape and particle size.

The tin oxide particles of the present invention are characterized in that their shape and particle size are uniform. As is clear from the attached photograph, they are the polyhedrons having at least 8 planes with the uniform shape and particle size.

The indium oxide particles of the present invention are characterized in that their shape and particle size are uniform. As is clear from the attached photograph, they are the polyhedrons having at least 8 planes with the uniform shape and particle size.

According to the present invention, it is possible to obtain the various metal oxide powders which are not agglomerated particles but have the narrow particle distribution that cannot be hitherto achieved.

In many cases, the obtained metal oxide powder is a mass of the uniform polyhedral particles, and can be used in the variety of applications such as the raw materials of the metal oxide base ceramics which are used as the functional material or the structural material, as the filler or the pigment, or the raw material powder for the production of a single crystal or for flame spray coating. By the selection of the particle size and amount of the seed crystal, the metal oxide having the above properties and the arbitrarily controlled particle size can be obtained.

EXAMPLES

Hereinafter, the present invention will be explained in detail by examples, which do not limit the scope of the present invention in any way.

The measurements in the examples were carried out as follows:

1. Number Average Particle Size of Metal Oxide Powder

A scanning electron microscopic photograph of a metal oxide powder was taken using an electron microscope (T-300 manufactured by Nippon Electron Co., Ltd.). From the photograph, 80 to 100 particles were selected and image analyzed to calculate an average value of equivalent circle diameters of the particles and the distribution. The equivalent circle diameter is a diameter of a circle having the same area as that of each particle in the photograph.

2. Particle Size Distribution of Metal Oxide Powder

The particle size distribution was measured using a master sizer (manufactured by Malvern Instrument, Inc.) or a laser diffraction type particle size distribution analyzer (SALD-1100 manufactured by Shimadzu Corporation).

The metal oxide powder was dispersed in an aqueous solution of polyammonium acrylate or a 50 wt. % aqueous solution of glycerol, and particle sizes at 10%, 50% and 90% accumulation, respectively from the smallest particle size side in a cumulative particle size curve of the particles were measured as the $D_{10}$, $D_{50}$ and $D_{90}$. The $D_{50}$ was used as the agglomerated particle size, and the $D_{90}/D_{10}$ ratio was calculated as the criterion of the particle size distribution.

3. Crystal Phase of Metal Oxide Powder

The crystal phase of the metal oxide powder was measured by the X-ray diffraction method (RAD-C manufactured by Rigaku Co., Ltd.)

4. BET Specific Surface Area of Metal Oxide Powder A BET specific surface area of a metal oxide powder was measured by FLOWSORB-II (manufactured by Micromelitics).

5. Measurement of Primary Particle Size

A primary particle size d ($\mu$m) was calculated according to the formula of:

$$d=6/(S \times \rho)$$

wherein S ($m^2/g$) is a BET specific surface area of the powder, and $\rho$ ($g/cm^3$) is a density of the powder, provided that the primary particle size d is a diameter of a particle with the assumption that it were a sphere.

As the hydrogen chloride gas, bomb hydrogen chloride (purity: 99.9%) supplied by Tsurumi Soda Co., Ltd. or a decomposition gas of ammonium chloride (WAKO JUNYAKU, Special Grade Chemical) was used. When the decomposition gas of ammonium chloride was used, sublimation gas of ammonium chloride prepared by heating ammonium chloride at a temperature higher than its sublimation point was introduced in the furnace muffle to prepare the atmosphere gas. Ammonium chloride was completely decomposed at 1100° C. to provide a gas consisting of 33 vol. % of hydrogen chloride gas, 17 vol. % of nitrogen gas and 50 vol. % of hydrogen gas.

As the hydrogen bromide gas, a decomposition gas of ammonium bromide (WAKO JUNYAKU, Special Grade Chemical) was used. Sublimation gas of ammonium bromide prepared by heating ammonium bromide at a temperature higher than its sublimation point was introduced in the furnace muffle to prepare the atmosphere gas. Ammonium bromide was completely decomposed at 1100° C. to provide a gas consisting of 33 vol. % of hydrogen bromide gas, 17 vol. % of nitrogen gas and 50 vol. % of hydrogen gas.

As the hydrogen fluoride gas, a decomposition gas of ammonium fluoride (WAKO JUNYAKU, Special Grade Chemical) was used. Sublimation gas of ammonium fluoride prepared by heating ammonium fluoride at a temperature higher than its sublimation point was introduced in the furnace muffle to prepare the atmosphere gas. Ammonium fluoride was completely decomposed at 1100° C. to provide a gas consisting of 33 vol. % of hydrogen fluoride gas, 17 vol. % of nitrogen gas and 50 vol. % of hydrogen gas.

As the chloride gas, bomb chlorine gas (purity: 99.4%) supplied by Fujimoto Industries, Co., Ltd.) was used.

The metal oxide power or the metal oxide precursor powder was filled in an alumina or platinum vessel. When the halogen gas was used, the powder was filled in the alumina vessel. A depth of the filled powder was 5 mm. The calcination was carried out in a cylindrical furnace having a quartz muffle or an alumina muffle (manufactured by Motoyama Co., Ltd.). With flowing the nitrogen gas, temperature was raised at a heating rate of from 300° C./hr. to 500° C./hr., and when the temperature reached an atmosphere gas introduction temperature, the atmosphere gas was introduced.

A concentration of the atmosphere gas was adjusted by controlling gas flow rates by flow meters. The flow rate of the atmosphere was adjusted to a linear velocity of 20 mm/min. The total pressure of the atmosphere was always 1 atmosphere.

After the temperature reached the predetermined temperature, the powder was maintained at that temperature for a predetermined period of time. They will be referred to as "maintaining temperature" (calcination temperature) and "maintaining time" (calcination time).

After the predetermined maintaining time, the powder was spontaneously cooled to obtain the intended metal oxide powder.

The partial pressure of steam was adjusted by the change of saturated steam pressure depending on water temperature, and the steam was introduced in the furnace with the nitrogen gas.

Example 1

A metatitanic acid slurry (30 wt. % as reduced to titanium oxide weight. A product obtained in an intermediate step of the sulfuric acid method) was concentrated by an evaporator and then dried in an air at 200° C. to obtain raw material titanium oxide powder. This powder had a BET specific surface area of 183 m$^2$/g (a primary particle size calculated from the BET specific surface area=0.008 em). According to the X-ray diffraction analysis, the powder was found to be anatase type titanium oxide, and no other peak was observed.

The raw material titanium oxide powder (1.2 g) was filled in an alumina vessel. Its bulk density was 19% of the theoretical density. Then, the powder was placed in the quartz muffle, and heated from room temperature at a heating rate of 500° C./hr. while flowing the atmosphere gas consisting of 100 vol. % of hydrogen chloride at a linear velocity of 20 mm/min., and calcined at 1100° C. for 30 minutes, followed by spontaneous cooling to obtain a titanium oxide powder. The weight of the titanium oxide powder in the alumina vessel after calcination was 85% of that of the powder before calcination.

The obtained titanium oxide powder was the rutile type titanium oxide according to the result of the X-ray diffraction analysis, and no other peak was observed. The BET specific surface area was 0.2 m$^2$/g. According to the result of the observation by the scanning electron microscope, the rutile type titanium oxide consisted of polyhedral particles having 8 to 20 planes, and had the number average particle size of 9 μm. The agglomerated particle size ($D_{50}$) according to the particle size distribution measurement was 14.2 μm, and the $D_{90}/D_{10}$ ratio was 3, which indicated the narrow particle size distribution. The ratio of the agglomerated particle size to the number average particle size was 1.6.

Figure 1:
FIG. 1 is a scanning electron microscopic photograph (×850) showing a particle structure of a titanium oxide powder observed in Example 1.

The obtained particles were observed by a transmission electron microscope. No defect was observed in the particles, and it was found that the particle was a single crystal. The results are shown in Table 1. An electron microscopic photograph of the obtained rutile type titanium oxide is shown in FIG. 1.

Example 2

In the same manner as in Example 1 except that an atmosphere gas consisting of 10 vol. % of hydrogen chloride and 90 vol. % of nitrogen was used in place of the atmosphere gas of 100 vol. % hydrogen chloride, the rutile type titanium oxide was obtained. The results are shown in Table 1.

Example 3

In the same manner as in Example 1 except that an atmosphere gas consisting of 30 vol. % of hydrogen chloride, 10 vol. % of steam and 60 vol. % of nitrogen was used in place of the atmosphere gas of 100 vol. % hydrogen chloride, the rutile type titanium oxide was obtained. The results are shown in Table 1.

Example 4

In the same manner as in Example 1 except that an atmosphere gas consisting of 30 vol. % of hydrogen chloride and 70 vol. % of an air was used in place of the atmosphere gas of 100 vol. % hydrogen chloride, the rutile type titanium oxide was obtained. The results are shown in Table 1.

Example 5

The raw material titanium oxide powder as used in Example 1 was filled in the alumina vessel and placed in the quartz muffle, and heated at a heating rate of 500° C./hr. When the temperature reached 600° C., the decomposed gas of sublimated ammonium chloride was introduced, and the powder was heated in the decomposed gas atmosphere at 1100° C. for 30 minutes, followed by spontaneous cooling to obtain the rutile type titanium oxide. At 1100° C., the components of the decomposed gas were hydrogen chloride gas, nitrogen and hydrogen, and their volume ratio was 33:17:50. The results are shown in Table 1.

Example 6

In the same manner as in Example 5 except that ammonium bromide was used in place of ammonium chloride, the rutile type titanium oxide was obtained. At 1100° C., the components of the decomposed gas of ammonium bromide were hydrogen bromide gas, nitrogen and hydrogen, and their volume ratio was 33:17:50. The results are shown in Table 1.

Example 7

In the same manner as in Example 5 except that anatase type titanium oxide (DC 90 manufactured by Ishihara Industries, Co., Ltd. The BET specific surface area of 104 m$^2$/g, and the primary particle size calculated from the BET specific surface area=0.013 μm) was used as the raw material oxide powder, ammonium fluoride was used in place of ammonium chloride, and the alumina muffle was used in place of the quartz muffle, the rutile type titanium oxide was obtained. At 1100° C., the components of the decomposed gas of ammonium fluoride were hydrogen fluoride gas, nitrogen and hydrogen, and their volume ratio was 33:17:50. The electron microscopic photograph of the obtained rutile type titanium oxide is shown in FIG. 2. The results are shown in Table 1.

Example 8

In the same manner as in Example 1 except that an atmosphere gas consisting of 30 vol. % of chlorine, 10 vol. % of steam and 60 vol. % of nitrogen was used in place of the atmosphere gas of 100 vol. % hydrogen chloride, the rutile type titanium oxide was obtained. The results are shown in Table 1.

Example 9

Figure 3:
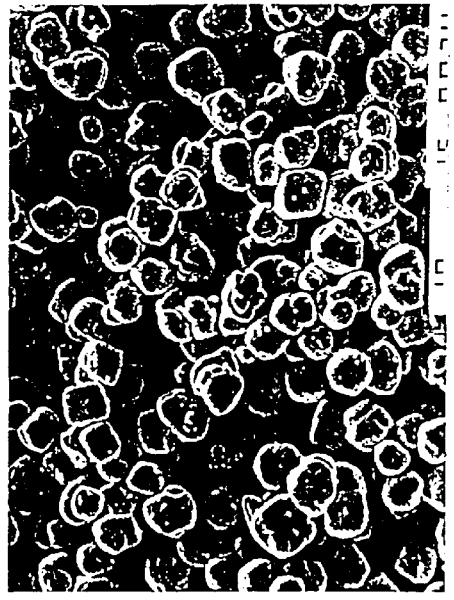
FIG. 3 is a scanning electron microscopic photograph (×1700) showing a particle structure of a titanium oxide powder observed in Example 9.

In the same manner as in Example 1 except that the anatase type titanium oxide powder as used in Example 7 was used as the raw material titanium oxide powder, and an atmosphere gas of 100 vol. % of chlorine was used in place of the atmosphere gas of 100 vol. % hydrogen chloride, the rutile type titanium oxide was obtained. The results are shown in Table 1. The electron microscopic photograph of the obtained rutile type titanium oxide powder is shown in FIG. 3.

Example 10

In the same manner as in Example 1 except that an atmosphere gas of 100 vol. % of chlorine was used in place of the atmosphere gas of 100 vol. % hydrogen chloride, the rutile type titanium oxide was obtained. The results are shown in Table 1.

In the same manner as in Example 1 except that the above raw material titanium oxide powder containing the seed

TABLE 1

| | | Calcination conditions | | | | | | | | | | Particle size distribution | | | | | Number |
|---|---|---|---|---|---|---|---|---|---|---|---|---|---|---|---|---|---|
| Ex. No. | Oxide | Atmosphere gas (vol. %) | | | | | | | | Gas introduction temp. (° C.) | Maintaining temp. (° C.) | Maintaining time (min.) | Number average particle size ($\mu$m) | Agglomerated particle size $D_{50}$ ($\mu$m) | Ratio of $D_{50}$ to No. Av. particle size | $D_{90}$/ $D_{10}$ | BET specific surface area ($m^2$/g) | of planes of polyhedron particles |
| | | HCl | HBr | HF | $Cl_2$ | $N_2$ | $H_2O$ | $H_2$ | Air | | | | | | | | | |
| 1 | $TiO_2$ | 100 | | | | | | | | Room temp. | 1100 | 30 | 9 | 14.2 | 1.6 | 3 | 0.2 | 8–20 |
| 2 | $TiO_2$ | 10 | | | | 90 | | | | Room temp. | 1100 | 30 | 5 | 7.3 | 1.5 | 3 | 0.2 | 8–20 |
| 3 | $TiO_2$ | 30 | | | | 60 | 10 | | | Room temp. | 1100 | 30 | 5 | 9.0 | 1.8 | 3 | | 8–20 |
| 4 | $TiO_2$ | 30 | | | | | | | 70 | Room temp. | 1100 | 30 | 5 | 8.0 | 1.6 | 4 | | 8–20 |
| 5 | $TiO_2$ | 33 | | | | 17 | | 50 | | 600 | 1100 | 30 | 4 | | | | | 8–20 |
| 6 | $TiO_2$ | | 33 | | | 17 | | 50 | | 600 | 1100 | 30 | 8 | 12 | 1.5 | 5 | 0.2 | 8–20 |
| 7 | $TiO_2$ | | | 33 | | 17 | | 50 | | 600 | 1100 | 30 | 2 | | | | | 8–20 |
| 8 | $TiO_2$ | | | | 30 | 60 | 10 | | | Room temp. | 1100 | 30 | 5 | | | | | 8–20 |
| 9 | $TiO_2$ | | | | | 100 | | | | Room temp. | 1100 | 30 | 3.3 | 6.2 | 1.9 | 4 | | 8–20 |
| 10 | $TiO_2$ | | | | | 100 | | | | Room temp. | 1100 | 30 | 5 | 11.4 | 2.3 | 4 | | 8–20 |

Example 11

In the same manner as in Example 1 except that metatitanic acid TH-30 (trade name) manufactured by TEIKA Co., Ltd. was used as the raw material powder, and the calcination temperature was changed to 800° C., the rutile type titanium oxide was obtained. The results are shown in Table 2.

Example 12

In the same manner as in, Example 1 except that an anatase titanium oxide powder KA-10 (trade name) manufactured by Titanium Industries Co., Ltd. was used as the raw material powder, and an atmosphere gas consisting of 45 vol. % of hydrogen chloride, 45 vol. % of an air and 10 vol. % of steam was used, the rutile type titanium oxide was obtained.

As the result of the observation using the scanning electron microscope, it was found that the polyhedral particles having 8 to 20 planes were produced, the length of the primary particles was about 10 $\mu$m and the diameter was about 1 $\mu$m. The agglomerated particle size was 7.5 $\mu$m. When the average value 6 $\mu$m of the average length and the average diameter of the primary particles was employed as a number average particle size, the ratio of the agglomerated particle size to the number average primary particle size was 1.3. The results are shown in Table 2.

Example 13

To the raw material titanium oxide powder of Example 1 (10.00 g), a rutile type titanium oxide powder (TTO-55, a trade name, manufactured by Titanium Industries Co., Ltd. A BET specific surface area of 38.6 $m^2$/g) (0.30 g corresponding to 3 wt. %) was added as the seed crystal. The addition manner comprised dispersing the raw material titanium oxide powder and the seed crystal by ultrasonic in isopropanol to prepare a slurry and drying the slurry with an evaporator and a vacuum drier.

crystal was used, the rutile titanium oxide was produced. The results are shown in Table 2.

Example 14

To the raw material titanium oxide powder of Example 1, 3 wt. % of a high purity rutile powder (CR-EL manufactured by Ishihara Industries Co., Ltd. A BET specific surface area of 6.8 $m^2$/g. A primary particle size calculated from the BET specific surface area=0.20 $\mu$m) was added as the seed crystal. The addition manner comprised dispersing the raw material titanium oxide powder and the seed crystal were dispersed by ultrasonic in isopropanol to prepare a slurry and drying the slurry with an evaporator and a vacuum drier. This raw material titanium oxide powder containing the seed crystal was filled in the alumina vessel. Its bulk density was 19% of the theoretical value.

Then, the powder was placed in the quartz muffle, and heated from room temperature at a heating rate of 500° C./hr. while flowing nitrogen gas. When the temperature reached 800° C., the nitrogen gas was changed to an atmosphere gas of 100 vol. % hydrogen chloride, and the powder was calcined at 1100° C. for 30 minutes while flowing the hydrogen chloride gas at a linear velocity of 20 mm/min., followed by spontaneous cooling to obtain a titanium oxide powder. The weight of the titanium oxide powder in the alumina vessel after calcination was 85 wt. % of that of the powder before calcination. The results are shown in Table 2.

Example 15

Figure 4:
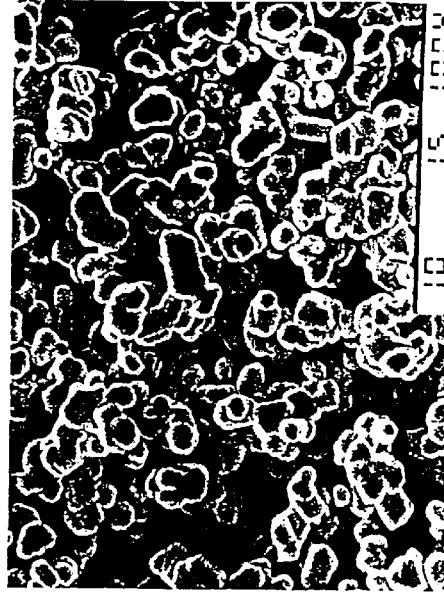
FIG. 4 is a scanning electron microscopic photograph (×4300) showing a particle structure of a titanium oxide powder observed in Example 15.

In the same manner as in Example 14 except that an atmosphere gas consisting of 30 vol. % of hydrogen chloride and 70 vol. % of nitrogen was used in place of the atmosphere gas of 100 vol. % hydrogen chloride, the rutile type titanium oxide was obtained. The results are shown in Table 2. The electron microscopic photograph of the obtained rutile titanium oxide powder is shown in FIG. 4.

Example 16

In the same manner as in Example 14 except that an atmosphere gas consisting of 30 vol. % of chlorine and 70 vol. % of an air was used in place of the atmosphere gas of 100 vol. % hydrogen chloride, the rutile type titanium oxide was obtained. The results are shown in Table 2.

Example 17

In the same manner as in Example 14 except that an atmosphere gas consisting of 30 vol. % of hydrogen chloride, 10 vol. % of steam and 60 vol. % of nitrogen was used in place of the atmosphere gas of 100 vol. % hydrogen chloride, the rutile type titanium oxide was obtained. The results are shown in Table 2.

Example 18

In the same manner as in Example 14 except that an atmosphere gas of 100 vol. % chlorine gas was used in place of the atmosphere gas of 100 vol. % hydrogen chloride, the rutile type titanium oxide was obtained. The results are shown in Table 2.

Figure 5:
FIG. 5 is a scanning electron microscopic photograph (×1700) showing a particle structure of a titanium oxide powder observed in Comparative Example 1.

$D_{90}/D_{10}$ ratio was 21, which indicated the broad particle size distribution. A ratio of the agglomerated particle size to the number average particle size was 3. When the obtained particles were observed by the scanning electron microscope, defects were found in the particle, and the particle was not a single crystal. The results are shown in Table 2. The scanning electron microscopic photograph of the obtained rutile titanium oxide powder is shown in FIG. 5.

Comparative Example 2

In the same manner as in Comparative Example 1 except that the same raw material powder as used in Example 14 was used, the rutile titanium oxide was obtained. The results are shown in Table 2.

TABLE 2

| | | Calcination conditions | | | | | | | | | | | | Particle size distribution | | | | Number |
|---|---|---|---|---|---|---|---|---|---|---|---|---|---|---|---|---|---|---|
| Ex. No. | Oxide | Atmosphere gas (vol. %) | | | | | | | | Gas introduction temp. (° C.) | Maintaining temp. (° C.) | Maintaining time (min.) | Number average particle size ($\mu$m) | Agglomerated particle size $D_{50}$ ($\mu$m) | Ratio of $D_{50}$ to No. Av. particle size | $D_{90}/D_{10}$ | BET specific surface area ($m^2/g$) | of planes of polyhedron particles |
| | | HCl | HBr | HF | $Cl_2$ | $N_2$ | $H_2O$ | $H_2$ | Air | | | | | | | | | |
| 11 | $TiO_2$ | 100 | | | | | | | | Room temp. | 800 | 30 | 13 | 15.3 | 1.2 | 5 | 0.1 | 8–20 |
| 12 | $TiO_2$ | 45 | | | | 10 | | | 45 | Room temp. | 1100 | 30 | 6 | 7.5 | 1.3 | 5 | 0.4 | 8–20 |
| 13 | $TiO_2$ | 100 | | | | | | | | Room temp. | 1100 | 30 | 1 | 1.9 | 1.9 | 4 | 1.4 | 8–24 |
| 14 | $TiO_2$ | 100 | | | | | | | | 800 | 1100 | 30 | 1.2 | 5.3 | 4.4 | 5 | | 8–24 |
| 15 | $TiO_2$ | 30 | | | 70 | | | | | 800 | 1100 | 30 | 1.1 | 4.2 | 3.8 | 5 | | 8–24 |
| 16 | $TiO_2$ | 30 | | | | | | | 70 | 800 | 800 | 30 | 0.9 | 2.8 | 3.1 | 4 | | 8–24 |
| 17 | $TiO_2$ | | | | 30 | 60 | 10 | | | 800 | 1100 | 30 | 1.0 | 4.3 | 4.3 | 5 | | 8–24 |
| 18 | $TiO_2$ | | | | 100 | | | | | 800 | 1100 | 30 | 1.0 | 3.6 | 3.6 | 5 | | 8–24 |
| 19 | $TiO_2$ | | | | 30 | 60 | 10 | | | 800 | 1100 | 30 | 1.3 | 4.7 | 3.6 | 5 | | 8–24 |
| C. 1 | $TiO_2$ | | | | | | | | 100 | Room temp. | 1100 | 180 | 0.5 | 1.5 | 3.0 | 21 | | Bulk |
| C. 2 | $TiO_2$ | | | | | | | | 100 | Room temp. | 1100 | 180 | 0.4 | 5.8 | 14.5 | 44 | | Bulk |

Example 19

In the same manner as in Example 18 except that an amount of the seed crystal was changed to 1 wt. %, the rutile type titanium oxide was obtained. The results are shown in Table 2.

Comparative Example 1

Using the same raw material and the furnace as used in Example 1, the raw material powder was calcined in an air with opening the both ends of the furnace. The raw material powder was calcined at 1100° C. for 180 minutes, followed by spontaneous cooling to obtain a titanium oxide powder.

The obtained titanium oxide powder was analyzed by X-ray diffraction to confirm that it was a rutile type titanium oxide. No other peak was observed. The BET specific surface area was 1.5 $m^2/g$. According to the observation of the powder by the scanning electron microscope, no polyhedron particle was formed, and spherical particles were in the agglomerated state, and their number average particle size was 0.5 $\mu$m.

The agglomerated particle size ($D_{50}$) according to the particle distribution measurement was 1.5 $\mu$m, and the Example 20

Zirconium oxychloride octahydrate (WAKO JUNYAKU, Special Grade Chemical) (78.3 g) was dissolved in pure water (400 g) to obtain an aqueous solution of a zirconium salt. In aqueous ammonia (25 wt. %. WAKO JUNYAKU, Special Grade Chemical) contained in a 2 liter beaker, the above aqueous solution of the zirconium salt was added over 2 hours while stirring to neutralize the salt and coprecipitate them. The precipitate was filtered through a filter paper and washed with pure water, followed by drying in vacuo at 100° C. to obtain a zirconium oxide precursor powder. The BET specific surface area of this precursor powder was 255 $m^2/g$.

The zirconium oxide precursor powder was precalcined in the air at 500° C. to obtain a raw material powder.

According to the X-ray diffraction analysis, peaks assigned to monoclinic zirconium oxide and tetragonal zirconium oxide were observed. The BET specific surface area was 79.4 $m^2/g$, and the primary particle size calculated from the BET specific surface area was 0.013 $\mu$m.

The raw material powder was filled in a platinum vessel. its bulk density was 15% of the theoretical value.

Then, the powder was placed in the quartz muffle, and with flowing an atmosphere gas of 100 vol. % hydrogen chloride at a linear velocity of 20 mm/min., the powder was heated from room temperature at a heating rate of 300° C./hr., and calcined at 1100° C. for 60 minutes, followed by spontaneous cooling to obtain a zirconium oxide powder. The weight of the zirconium oxide powder in the platinum vessel after calcination was 95 wt. % of that of the powder before calcination.

Figure 6:
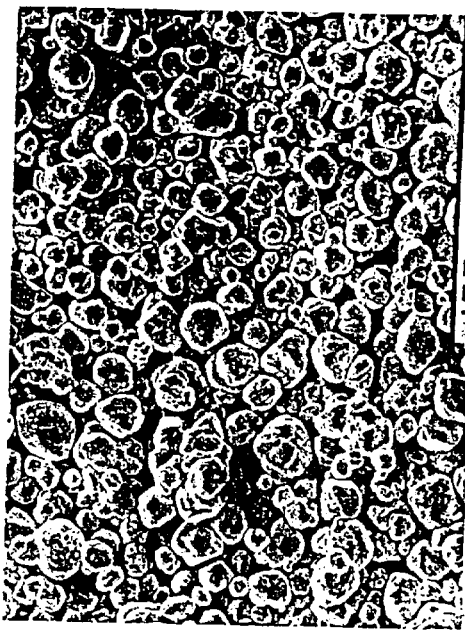
FIG. 6 is a scanning electron microscopic photograph (×430) showing a particle structure of a zirconium oxide powder observed in Example 20.

According to the X-ray diffraction analysis, the obtained zirconium oxide powder was monoclinic zirconium oxide, and no other peak was observed. According to the observation by the scanning electron microscope, the polyhedral particles having 8 to 24 planes each were formed, and the number average particle size was 12 μm. The agglomerated particle size ($D_{50}$) according to the particle size distribution measurement was 15 μm, and the $D_{90}/D_{10}$ ratio was 3, which indicated the narrow particle size distribution. A ratio of the agglomerated particle size to the number average particle size was 1.3. The results are shown in Table 3. The scanning electron microscopic photograph of the obtained powder is shown in FIG. 6.

Example 21

Zirconium tetrachloride (Merk. Purity, 98%) (56.8 g) was dissolved in pure water (500 g) to obtain an aqueous solution of a zirconium salt. in pure water (760 g) contained in a 2 liter beaker, the above aqueous solution of the zirconium salt was added over 3 hours while stirring. During the addition, aqueous ammonium (25 wt. %. WAKO JUNYAKU, Special Grade Chemical) was added with main- taining pH constant at 4.0 with a pH controller (FC-10 manufactured by Tokyo Rika Kiki Co., Ltd.) to neutralize the salt and obtain a precipitate. An amount of the added aqueous ammonia was 58.2 g. The precipitate was filtered through a filter paper and washed with pure water, followed by drying in vacuo at 100° C. to obtain a zirconium oxide precursor powder. The BET specific surface area of this precursor powder was 15 $m^2/g$, and the primary particle size calculated from the BET specific surface area was 0.07 μm.

The zirconium oxide precursor powder was calcined in the air at 500° C. to obtain a raw material powder.

According to the X-ray diffraction analysis, peaks assigned to monoclinic zirconium oxide and tetragonal zirconium oxide were observed. The BET specific surface area was 18.2 $m^2/g$, and the primary particle size calculated from the BET specific surface area was 0.05 μm.

The raw material powder was filled in a platinum vessel. Its bulk density was 25% of the theoretical value.

Figure 7:
FIG. 7 is a scanning electron microscopic photograph (×430) showing a particle structure of a zirconium oxide powder observed in Example 21.

Thereafter, the raw material powder was calcined in the same manner as in Example 20 to obtain the zirconium oxide powder. The weight of the zirconium oxide powder in the platinum vessel after calcination was 95 wt. % of that of the powder before calcination. The results are shown in Table 3. The electron microscopic photograph of the obtained powder is shown in FIG. 7.

Example 22

As a raw material zirconium oxide powder, high purity zirconia powder (ZP 20 manufactured by Chichibu Cement Co., Ltd. A BET specific surface area=93 $m^2/g$. A primary particle size calculated from the BET specific surface area= 0.01 μm) was used. To this raw material zirconium oxide powder, 2 wt. % of a powder which was obtained by sintering the above zirconia powder in an air at 1400° C. for 3 hours and milling it in a ball mill (A BET specific surface area=2.8 $m^2/g$. A primary particle size calculated from the BET specific surface area=0.36 am) was added as a seed crystal. The addition manner comprised dispersing the raw material zirconium oxide powder and the seed crystal by ultrasonic in isopropanol to prepare a slurry and drying the slurry with an evaporator and a vacuum drier.

The raw material powder containing the seed crystal was filled in a platinum vessel. Its bulk density was 25% of the theoretical value.

Figure 8:
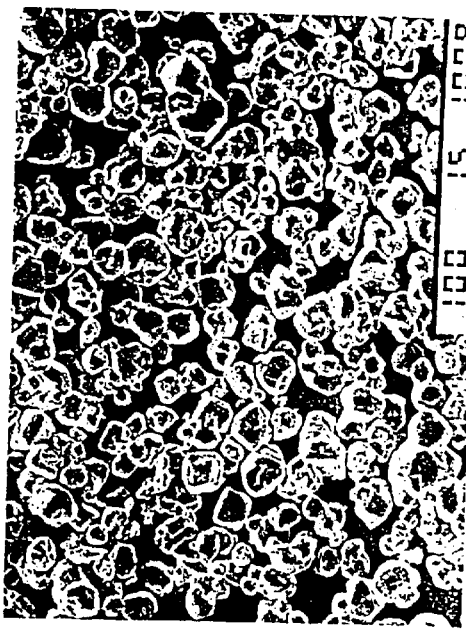
FIG. 8 is a scanning electron microscopic photograph (×430) showing a particle structure of a zirconium oxide powder observed in Example 22.

Thereafter, the raw material powder was calcined in the same manner as in Example 20 to obtain the zirconium oxide powder. The results are shown in Table 3. The electron microscopic photograph of the obtained zirconium oxide powder is shown in FIG. 8.

Comparative Example 3

In the same manner as in Example 20 except that an atmosphere gas of 100 vol. % air was used in place of the atmosphere gas of 100 vol. % hydrogen chloride, the zirconium oxide powder was obtained. According to the observation by the scanning electron microscope, no polyhedron particle was formed, and the spherical particles were in the agglomerated state, and their number average particle size was 0.2 μm.

Figure 9:
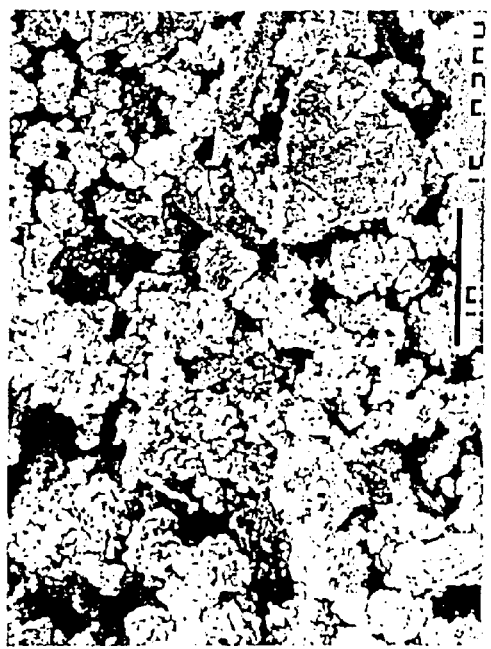
FIG. 9 is a scanning electron microscopic photograph (×1720) showing a particle structure of a zirconium oxide powder observed in Comparative Example 3.

The agglomerated particle size ($D_{50}$) according to the particle size distribution measurement was 11 μm, and the $D_{90}/D_{10}$ ratio was 22, which indicated the broad particle size distribution. A ratio of the agglomerated particle size to the number average particle size was 55. The results are shown in Table 3. The scanning electron microscopic photograph of the obtained zirconium oxide powder is shown in FIG. 9.

Comparative Example 4

In the same manner as in Comparative Example 3 except that the raw material powder of Example 22 but containing no seed crystal was used, the zirconium oxide powder was obtained. The results are shown in Table 3.

Comparative Example 5

In the same manner as in Comparative Example 3 except that the raw material powder of Example 22 containing the seed crystal was used, the zirconium oxide powder was obtained. The results are shown in Table 3.

Example 23

As a raw material powder, a magnesium oxide powder having the BET specific surface area of 132 $m^2/g$ (A primary particle size calculated from the BET specific surface area =0.01 μm) was used and filled in a platinum vessel. Its bulk density was 2% of the theoretical value.

Then, the powder was placed in the quartz muffle, and with flowing nitrogen gas at a linear velocity of 20 mm/min., the powder was heated from room temperature at a heating rate of 300° C./hr When the temperature reached 800° C., the nitrogen gas was changed to an atmosphere gas of 100 vol. % hydrogen chloride. While flowing this atmosphere gas at a linear velocity of 20 mm/min., the powder was calcined at 1000° C. for 30 minutes, followed by spontaneous cooling to obtain a magnesium oxide powder.

Figure 10:
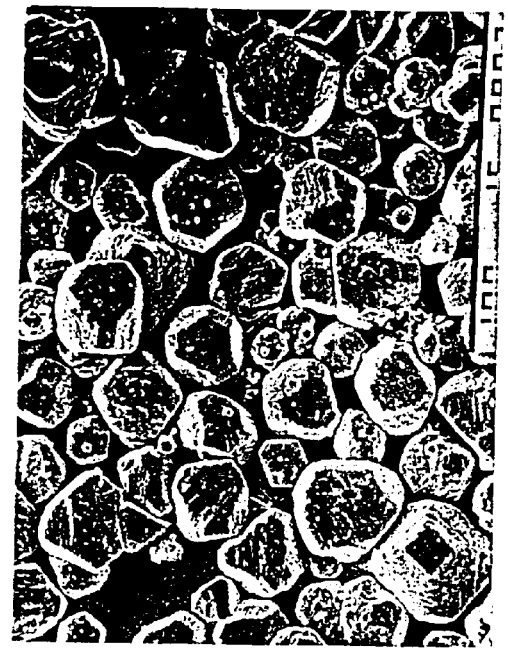
FIG. 10 is a scanning electron microscopic photograph (×430) showing a particle structure of a magnesium oxide powder observed in Example 23.

According to the observation by the scanning electron microscope, the polyhedral particles having 8 to 24 planes were formed, and the number average particle size was 30 μm. The results are shown in Table 3. The scanning electron microscopic photograph of the magnesium oxide powder is shown in FIG. 10.

Example 24

To the raw material magnesium oxide powder of Example 23, 0.1 wt. % of a magnesium oxide powder having the BET specific surface area of 8.0 m²/g (the primary particle size calculated from the BET specific surface area=0.20 μm) was added as a seed crystal.

The addition manner comprised dispersing the raw material magnesium oxide powder and the seed crystal by ultrasonic in isopropanol to prepare a slurry and drying the slurry with an evaporator and a vacuum drier. The raw material magnesium oxide powder containing the seed crystal was filled in the platinum vessel. Its bulk density was 3% of the theoretical value. Thereafter, in the same manner as in Example 23, the magnesium oxide powder was obtained.

Figure 11:
FIG. 11 is a scanning electron microscopic photograph (×850) showing a particle structure of a magnesium oxide powder observed in Example 24.

According to the observation by the scanning electron microscope, the number average particle size was 8 Itm. The agglomerated particle size ($D_{50}$) according to the particle size distribution measurement was 11 μm, and the $D_{90}/D_{10}$ ratio was 3, which indicated the narrow particle size distribution. A ratio of the agglomerated particle size to the number average particle size was 1.4. The results are shown in Table 3. The scanning electron microscopic photograph of the obtained powder is shown in FIG. 11.

Example 25

Figure 12:
FIG. 12 is a scanning electron microscopic photograph (×850) showing a particle structure of a magnesium oxide powder observed in Example 25.

In the same manner as in Example 24 except that the amount of the seed crystal was changed to 3 wt. %, the magnesium oxide powder was obtained. The results are shown in Table 3. The scanning electron microscopic photograph of the obtained zirconium oxide powder is shown in FIG. 12.

Comparative Example 6

Figure 13:
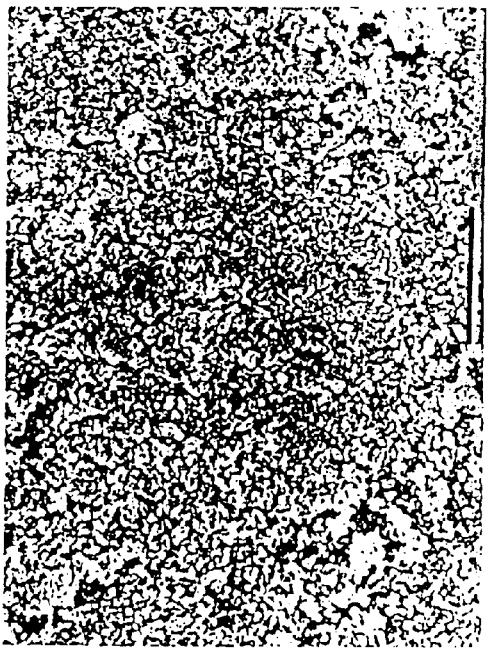
FIG. 13 is a scanning electron microscopic photograph (×1720) showing a particle structure of a magnesium oxide powder observed in Comparative Example 6.

In the same manner as in Example 23 except that the atmosphere gas of 100 vol. % air was supplied from the room temperature in place of the atmosphere gas of 100 vol. % hydrogen chloride, the magnesium oxide powder was obtained. According to the observation by the scanning electron microscope, no polyhedral particle was formed, spherical particles were in the agglomerated state, and the number average particles size was 0.4 μm. The agglomerated particle size ($D_{50}$) according to the particle size distribution measurement was 1 μm, and the $D_{90}/D_{10}$ ratio was 17, which indicated the broad particle size distribution. The results are shown in Table 3. The scanning electron microscopic photograph of the obtained magnesium oxide powder is shown in FIG. 13.

Comparative Example 7

In the same manner as in Comparative Example 6 except that the raw material powder of example 25 was used, the magnesium oxide powder was obtained. The results are shown in Table 3.

TABLE 3

| Ex. No. | Oxide | Atmosphere gas (vol. %) | | | | | | | | Calcination conditions | | | Particle size distribution | | | | BET specific surface area ($m^2/g$) | Number of planes of polyhedron particles |
| | | HCl | HBr | HF | $Cl_2$ | $N_2$ | $H_2O$ | $H_2$ | Air | Gas introduction temp. (° C.) | Maintaining temp. (° C.) | Maintaining time (min.) | Number average particle size (μm) | Agglomerated particle size $D_{50}$ (μm) | Ratio of $D_{50}$ to No. Av. particle size | $D_{90}/D_{10}$ | | |
|---|---|---|---|---|---|---|---|---|---|---|---|---|---|---|---|---|---|---|
| 20 | $ZrO_2$ | 100 | | | | | | | | Room temp. | 1100 | 60 | 12 | 15 | 1.3 | 3 | | 8–24 |
| 21 | $ZrO_2$ | 100 | | | | | | | | Room temp. | 1100 | 60 | 40 | 59 | 1.5 | 5 | | 8–24 |
| 22 | $ZrO_2$ | 100 | | | | | | | | Room temp. | 1100 | 60 | 10 | 19 | 1.9 | 4 | | 8–24 |
| C. 3 | $ZrO_2$ | | | | | | | | 100 | Room temp. | 1100 | 60 | 0.2 | 11 | 55 | 22 | | Bulk |
| C. 4 | $ZrO_2$ | | | | | | | | 100 | Room temp. | 1100 | 60 | 0.2 | 11 | 55 | 22 | | Bulk |
| C. 5 | $ZrO_2$ | | | | | | | | 100 | Room temp. | 1100 | 60 | 0.2 | 15 | 77 | 52 | | Bulk |
| 23 | MgO | 100 | | | | | | | | 800 | 1000 | 30 | 30 | | | | | 8–24 |
| 24 | MgO | 100 | | | | | | | | 800 | 1000 | 30 | 8 | 11 | 1.4 | 3 | | 8–24 |
| 25 | MgO | 100 | | | | | | | | 800 | 1000 | 30 | 4 | 6 | 1.5 | 4 | | 8–24 |
| C. 6 | MgO | | | | | | | | 100 | Room temp. | 1000 | 60 | 0.4 | 1 | 2.5 | 17 | | Bulk |
| C. 7 | MgO | | | | | | | | 100 | Room temp. | 1000 | 30 | 0.2 | 5 | 23 | 11 | | Bulk |

Example 26

Gamma iron (III) oxide (A BET specific surface area of 34.4 m²/g. A primary particle size calculated from the BET specific surface area of 0.03 μm) was filled in a platinum vessel. Its bulk density was 16% of the theoretical value.

Then, the powder was placed in the quartz muffle, and with flowing nitrogen gas at a linear velocity of 20 mm/min., the powder was heated from room temperature at a heating rate of 300° C./hr When the temperature reached 600° C., the nitrogen gas was changed to an atmosphere gas of 100 vol. % hydrogen chloride. While flowing this atmosphere gas at a linear velocity of 20 mm/min., the powder was calcined at 800° C. for 30 minutes, followed by spontaneous cooling to obtain an iron oxide powder. The weight of the iron oxide powder in the platinum vessel was 92% of that of the powder before calcination.

According to the X-ray diffraction analysis, the obtained iron oxide powder was alpha iron (III) oxide, and no other peak was observed.

Figure 14:
FIG. 14 is a scanning electron microscopic photograph (×1720) showing a particle structure of an iron oxide powder observed in Example 26.

According to the observation by the scanning electron microscope, the polyhedral particles having 8 to 20 planes were formed, and the number average particle size was 5 gim. The agglomerated particle size ($D_{50}$) according to the particle size distribution measurement was 6 μm, and the $D_{90}/D_{10}$ ratio was 4, which indicated the narrow particle size distribution. The ratio of the agglomerated particle size to the number average particle size was 1.3. The results are shown in Table 4. The scanning electron microscopic photograph of the obtained alpha iron (III) oxide powder is shown in FIG. 14.

Comparative Example 8

In the same manner as in Example 26 except that an atmosphere gas of 100 vol. % air was supplied from the room temperature in place of the atmosphere gas of 100 vol. % hydrogen chloride, the alpha iron (III) oxide powder was obtained.

Figure 15:
FIG. 15 is a scanning electron microscopic photograph (×1720) showing a particle structure of an iron oxide powder observed in Comparative Example 8.

According to the observation by the scanning electron microscope, no polyhedral particle was formed, the spherical particles were in the agglomerated state, and their number average particle size was 0.2 μm. The agglomerated particle size ($D_{50}$) according to the particle size distribution measurement was 7 μm, and the $D_{90}/D_{10}$ ratio was 100, which indicated the narrow particle size distribution. The ratio of the agglomerated particle to the number average particle size was 35. The results are shown in Table 4. The scanning electron microscopic photograph of the obtained alpha iron (III) oxide powder is shown in FIG. 15.

Example 27

Cerium (IV) sulfate (WAKO JUNYAKU, Special Grade Chemical) (100 g) was dissolved in pure water (900 g) to obtain an aqueous solution of a cerium (IV) sulfate. To this aqueous solution, a 2N aqueous solution of sodium hydroxide (WAKO JUNYAKU, Special Grade Chemical) was added till pH reached 10 to neutralize the solution and precipitate the salt. The precipitate was separated by centrifugation and stirred in pure water. These procedures were repeated several times to wash the precipitate with water. The precipitate washed with water was dried at 120° C. to obtain a cerium oxide precursor powder. According to the X-ray diffraction analysis, a broad peak assigned to cubic system cerium oxide was observed. The BET specific surface area of this precursor powder was 208.7 m²/g, and the primary particle size calculated from the BET specific surface area was 0.004 μm.

The cerium oxide precursor powder was filled in a platinum vessel. Then, it was placed in the quartz muffle, and with flowing an air at a linear velocity of 20 mm/min., the powder was heated from room temperature at a heating rate of 300° C./hr. When the temperature reached 400° C., the air was changed to an atmosphere gas of 100 vol. % hydrogen chloride. While flowing this atmosphere gas at a linear velocity of 20 mm/min., the powder was calcined at 1100° C. for 60 minutes, followed by spontaneous cooling to obtain a cerium oxide powder.

According to the X-ray diffraction analysis, the obtained iron oxide powder was cubic system cerium oxide, and no other peak was observed.

Figure 16:
FIG. 16 is a scanning electron microscopic photograph (×8500) showing a particle structure of a cerium oxide powder observed in Example 27.

According to the observation by the scanning electron microscope, the polyhedral particles having 6 planes, that is, the cubic particles were formed, and the number average particle size was 1.5 μm. The results are shown in Table 4. The scanning electron microscopic photograph of the obtained powder is shown in FIG. 16.

Comparative Example 9

In the same manner as in Example 27 except that, as an atmosphere gas, an air was used in place of hydrogen chloride, the cerium oxide powder was obtained.

Figure 17:
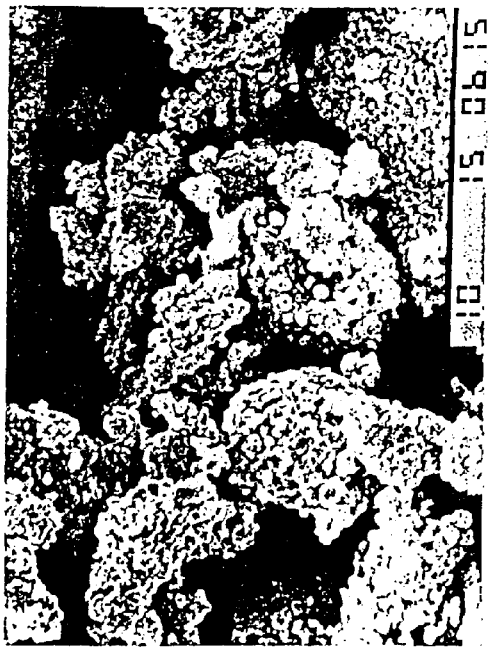
FIG. 17 is a scanning electron microscopic photograph (×4300) showing a particle structure of a cerium oxide powder observed in Comparative Example 9.

According to the observation by the scanning electron microscope, no polyhedral particle was formed, and the spherical particles were in the agglomerated state. The results are shown in Table 4. The scanning electron microscopic photograph of the obtained cerium oxide powder is shown in FIG. 17.

Example 28

As a raw material powder, a metastatic acid powder (Nippon Chemical Industries Co., Ltd. A BET specific surface area=75.4 m²/g) was used.

The metastatic acid powder was filled in an alumina vessel. Then, it was placed in the quartz muffle, and with flowing an air at a linear velocity of 20 mm/min., the powder was heated from room temperature at a heating rate of 300OC/hr. When the temperature reached 600° C., the air was changed to an atmosphere gas consisting of 50 vol. % of hydrogen chloride and 50 vol. % of the air. While flowing this atmosphere gas at a linear velocity of 20 mm/min., the powder was calcined at 1050° C. for 60 minutes, followed by spontaneous cooling to obtain a tin oxide powder.

According to the X-ray diffraction analysis, the obtained tin oxide powder was tin dioxide, and no other peak was observed.

Figure 18:
FIG. 18 is a scanning electron microscopic photograph (×8000) showing a particle structure of a tin oxide powder observed in Example 28.

According to the observation by the scanning electron microscope, the polyhedral particles having 8 to 24 planes were formed, and the number average particle size was 0.4 μm. The results are shown in Table 4. The scanning electron microscopic photograph of the obtained powder is shown in FIG. 18.

Comparative Example 10

In the same manner as in Example 28 except that, as an atmosphere gas, an air was used in place of hydrogen chloride, the tin oxide powder was obtained.

Figure 19:
FIG. 19 is a scanning electron microscopic photograph (×8000) showing a particle structure of a tin oxide powder observed in Comparative Example 10.

According to the observation by the scanning electron microscope, no polyhedral particle was formed, and the spherical particles were in the agglomerated state. The results are shown in Table 4. The scanning electron microscopic photograph of the obtained powder is shown in FIG. 19.

Example 29

Indium (III) chloride tetrahydrate(WAKO JUNYAKU, Special Grade Chemical) (14.67 g) was dissolved in pure water to obtain an aqueous solution of indium (III) sulfate (100 g). To this aqueous solution, a 1N aqueous ammonia (25% aqueous ammonia. WAKO JUNYAKU. Prepared by diluting Special Grade Chemical with pure water) was added till pH reached 8 to neutralize the solution and precipitate the salt. The precipitate was separated by filtration and stirred in pure water. These procedures were repeated several times to wash the precipitate with water. The precipitate washed with water was dried at 130° C. to obtain an indium oxide precursor powder.

According to the X-ray diffraction analysis, peaks assigned to indium hydroxide and indium oxyhydroxide were observed. The BET specific surface area of this precursor powder was 70.4 m²/g.

The indium oxide precursor powder was filled in an alumina vessel. Then, it was placed in the quartz muffle, and with flowing an air at a linear velocity of 20 mm/min., the powder was heated from room temperature at a heating rate of 600° C./hr. When the temperature reached 1000° C., the air was changed to an atmosphere gas consisting of 20 vol. % of hydrogen chloride and 80 vol. % of the air. While flowing this atmosphere gas at a linear velocity of 20 mm/min., the powder was calcined at 1000° C. for 30 minutes, followed by spontaneous cooling to obtain a cerium oxide powder.

Figure 20:
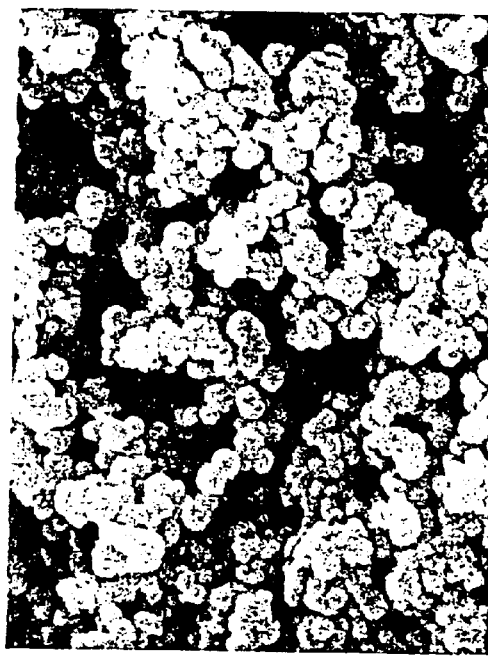
FIG. 20 is a scanning electron microscopic photograph (×15500) showing a particle structure of an indium oxide powder observed in Example 29.

According to the X-ray diffraction analysis, the obtained indium oxide powder was indium oxide, and no other peak was observed. The results are shown in Table 4. The scanning electron microscopic photograph of the obtained powder is shown in FIG. 20.

Comparative Example 11

In the same manner as in Example 29 except that, as an atmosphere gas, an air was used in place of hydrogen chloride, the indium oxide powder was obtained.

Figure 21:
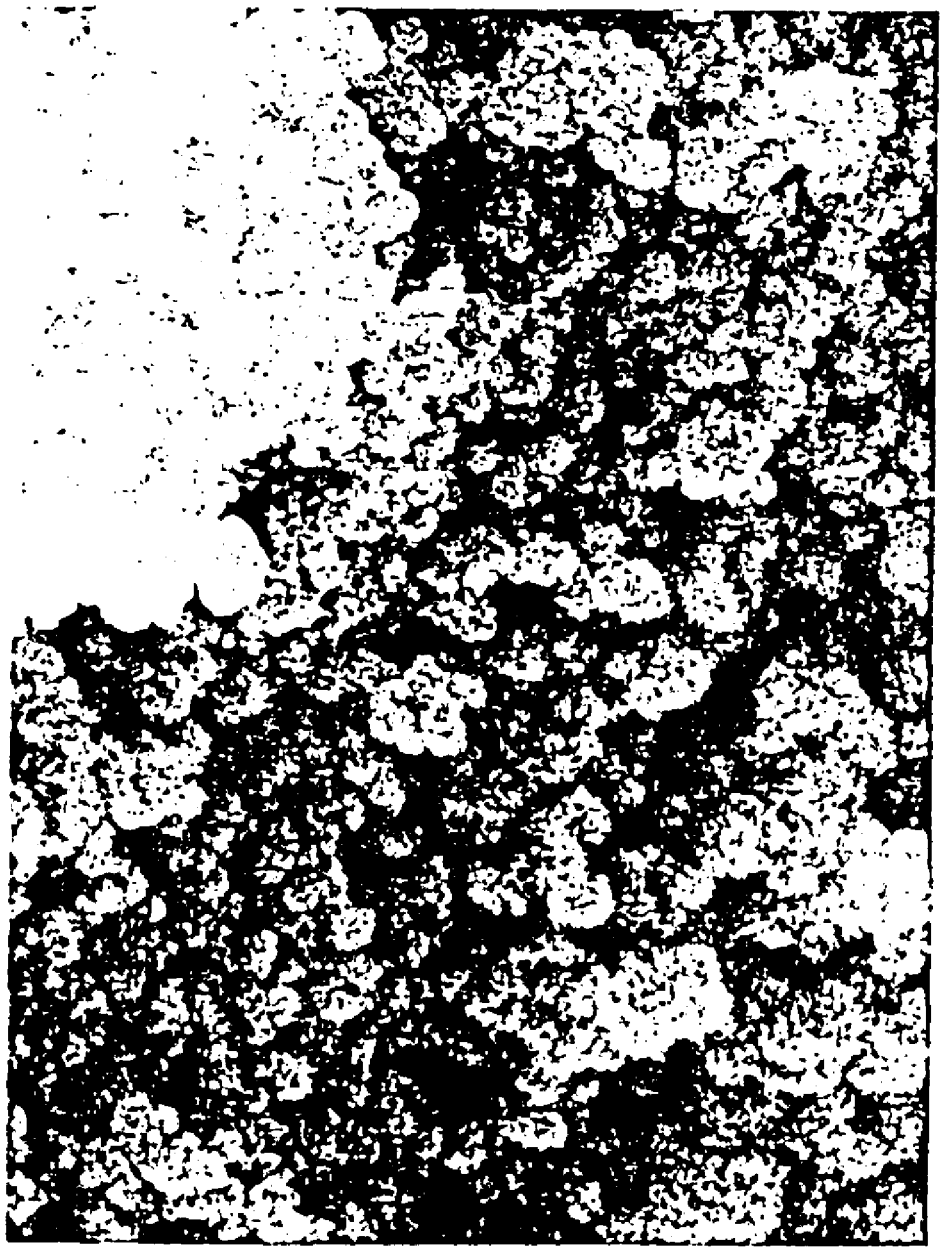
FIG. 21 is a scanning electron microscopic photograph (×15500) showing a particle structure of a cerium oxide powder observed in Comparative Example 11.

The results are shown in Table 4. The scanning electron microscopic photograph of the obtained cerium oxide powder is shown in FIG. 21.

temperature of from 600 to 1,400° C., further provided that the powder has a bulk density of 40% or less of a theoretical value, wherein said metal oxide powder or metal oxide precursor powder is a metal oxide powder or metal oxide precursor powder of a metal selected from the group consisting of, zirconium, cerium, indium and tin;

(B) calcining the powder of step (A) in an atmosphere containing at least one gas selected from the group consisting of (1) a hydrogen halide having hydrogen halide concentration of at least 1 vol % of the atmospheric gas, and (2) chlorine a concentration of which is 100%, to obtain a metal oxide powder having a $D_{90}/D_{10}$ ratio of 5 or less.

2. The method according to claim 1, wherein said calcination is carried out in the presence of a seed crystal.

3. The method according to claim 1 or 2, wherein said gas contained in said atmosphere gas is a hydrogen halide.

4. The method according to claim 3, wherein said hydrogen halide is hydrogen chloride or hydrogen bromide.

5. The method according to claim 3, wherein said hydrogen halide is hydrogen fluoride.

6. The method according to claim 1 or 2, wherein said gas contained in said atmosphere is prepared from a molecular halogen and steam.

7. The method according to claim 6, wherein said molecular halogen is chlorine or bromine.

8. The method according to claim 6, wherein said molecular halogen is fluorine.

9. The method according to claim 2, wherein said seed crystal has a bulk density of 40% or less of a theoretical value.

10. The method according to claim 1 or 2, wherein said metal oxide is formed on a site where said metal oxide powder or metal oxide precursor powder to be calcined is present.

11. The method according to claim 1, wherein a concentration of said hydrogen halide is at least 10 vol. % of said atmospheric gas.

TABLE 4

| Ex. No. | Oxide | Atmosphere gas (vol. %) | | | | | | | | Gas introduction temp. (° C.) | Maintaining temp. (° C.) | Maintaining time (min.) | Number average particle size (µm) | Agglomerated particle size $D_{50}$ (µm) | Ratio of $D_{50}$ to No. Av. particle size | $D_{90}/D_{10}$ | BET specific surface area (m²/g) | Number of planes of polyhedron particles |
|---|---|---|---|---|---|---|---|---|---|---|---|---|---|---|---|---|---|---|
| | | HCl | HBr | HF | $Cl_2$ | $N_2$ | $H_2O$ | $H_2$ | Air | | | | | | | | | |
| 26 | $Fe_2O_3$ | 100 | | | | | | | | 600 | 800 | 30 | 5 | 6 | 1.3 | 4 | | 8–20 |
| C. 8 | $Fe_2O_3$ | | | | | | | | 100 | Room temp. | 800 | 90 | 0.2 | 7 | 35 | 100 | | Bulk |
| 27 | $CeO_2$ | 100 | | | | | | | | 400 | 1100 | 60 | 1.5 | | | | | 6 |
| C. 9 | $CeO_2$ | | | | | | | | 100 | Room temp. | 1100 | 60 | 0.2 | 8 | 40 | 150 | | Bulk |
| 28 | $SnO_2$ | 50 | | | | | | | 50 | 600 | 1050 | 60 | 0.4 | | | | | 8–24 |
| C. 10 | $SnO_2$ | | | | | | | | 100 | Room temp. | 1000 | 60 | <0.1 | | | | | Bulk |
| 29 | $In_2O_3$ | 20 | | | | | | | 80 | 1000 | 1000 | 30 | 0.2 | | | | | 8–24 |
| C. 11 | $In_2O_3$ | | | | | | | | 100 | Room temp. | 1000 | 30 | <0.1 | | | | | Bulk |

What is claimed is:

1. A treatment method providing a metal oxide powder, consisting essentially of:

(A) providing a metal oxide powder or a metal oxide precursor powder which gives a metal oxide consisting of a single metal and oxygen by a decomposition reaction or an oxidation reaction in calcination at a

\* \* \* \* \*